Sept. 5, 1961  E. A. HOTCHKISS  2,998,861
ORCHARD CRANE
Filed Dec. 6, 1957  2 Sheets-Sheet 1
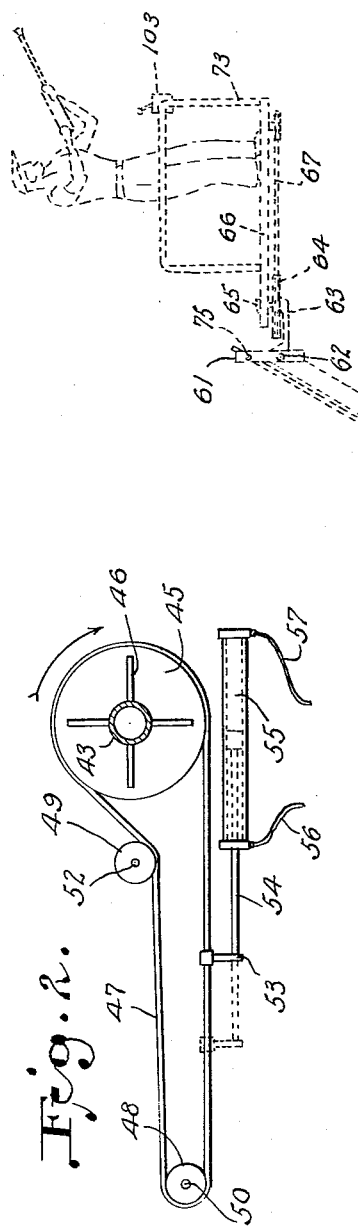
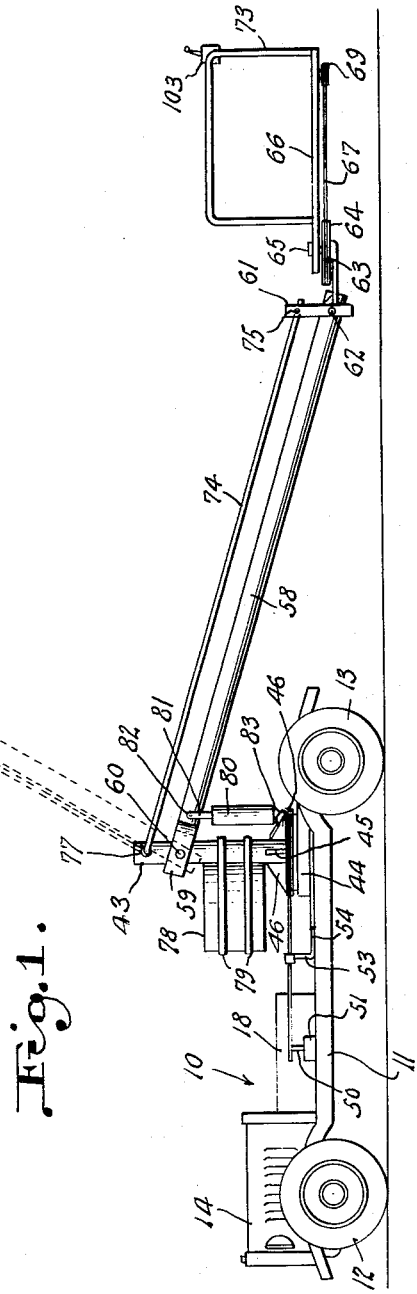
INVENTOR.
EDGAR A. HOTCHKISS
BY
Patrick D. Beavers
ATTORNEY.

Sept. 5, 1961
E. A. HOTCHKISS
2,998,861
ORCHARD CRANE
Filed Dec. 6, 1957
2 Sheets-Sheet 2
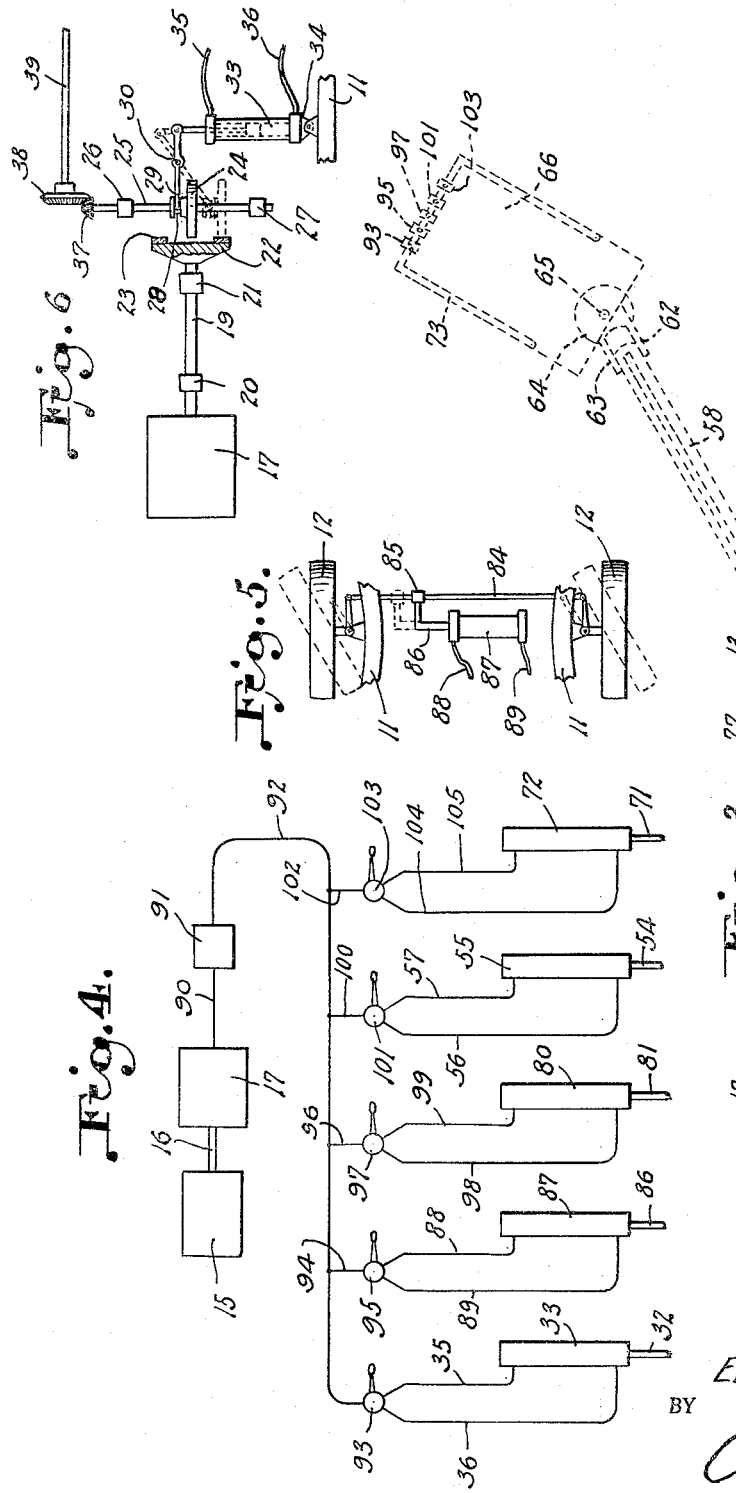
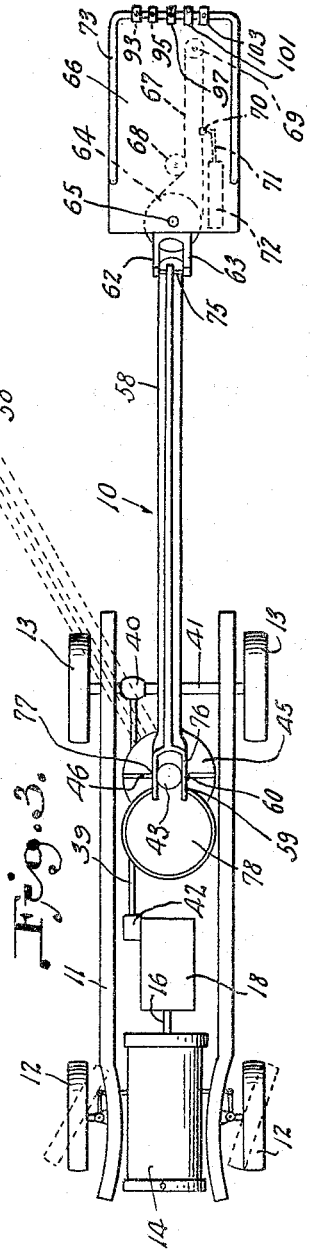
INVENTOR.
EDGAR A. HOTCHKISS
BY
Patrick D. Beavers
ATTORNEY.

United States Patent Office 2,998,861
Patented Sept. 5, 1961

2,998,861
ORCHARD CRANE
Edgar A. Hotchkiss, Carlton, Wash.
Filed Dec. 6, 1957, Ser. No. 701,128
1 Claim. (Cl. 182—2)

This invention relates to improvements in cranes and more particularly to a crane that is adapted to be used in servicing trees in an orchard.

An object of the invention is to provide a crane that will enable the operator thereof to prune, spray, thin or otherwise service the trees in an orchard.

Another object of the invention is to provide a self-propelled crane that can be driven through the rows of trees in an orchard and service half a tree on opposite sides thereof.

A further object of the invention is to provide a crane having a platform on the free end of a boom thereof that is adapted to support the operator thereof so that he may service the trees in an orchard.

The crane embodying the present invention eliminates the damage that is caused by ladders being placed against the trunks and branches of the trees and by the fruit pickers' bodies coming in contact with the trees. Also, the height at which fruit is picked is limited by the length of the ladder used to pick the fruit. With the present invention, fruit trees of any height may be successfully serviced without damage to the tree or fruit thereon.

With the above and other objects and advantages in view, the invention consists of the novel details of construction, arrangement and combination of parts more fully hereinafter described, claimed and illustrated in the accompanying drawings, in which:

FIG. 1 is an elevational view of a crane embodying the invention with the platform thereon shown in full lines in mounting position and in dotted lines in operating position;

FIG. 2 is a detailed elevational view, partly in section, of the turn table assembly for the platform and for the boom of the crane;

FIG. 3 is a top plan view of the crane of FIG. 1, with the platform in the same position as in FIG. 1;

FIG. 4 is a diagrammatic view of the control system for the crane;

FIG. 5 is a detailed fragmentary view showing the manner of controlling the front or steering wheels of the crane; and FIG. 6 is a detailed fragmentary view, partly in section, of the clutch for operating the rear or power wheels of the crane.

Referring more in detail to the drawings, wherein like parts are designated by like reference numerals, the reference numeral 10 is used to generally designate a crane embodying the invention.

The crane 10 comprises a chassis 11 that is provided with front or steering wheels 12 and rear or drive wheels 13. The chassis 11 is also provided with a hood and radiator assembly 14 that houses a small motor or engine 15. A drive shaft 16 connects the motor 15 to a small compressor 17 that is mounted in a housing 18.

A shaft 19 extending from the compressor 17 is journalled in a pair of bearings 20 and 21, respectively. A disc clutch 22 is connected to the shaft 19 and has a circular clutch facing 23 secured to the face thereof. A friction wheel 24 is slidably mounted on a shaft 25 which is journalled in bearings 26 and 27, respectively. The friction wheel 24 is mounted on the shaft 25 in such a manner that it will rotate the shaft 25, but will freely slide thereon. The friction wheel 24 has a grooved portion 28 thereon that is engaged by an operating fork 29. The fork 29 is pivoted at 30 at the center thereof and is pivoted at its end at 31 to a stem 32 of a piston for a double acting hydraulic cylinder 33. The cylinder 33 is pivotally connected at 34 to the chassis 11 and is provided with inlet and outlet supply lines 35 and 36, respectively. The shaft 25 at one end is provided with a bevelled gear 37 that engages a bevelled gear 38 that is connected to a drive shaft 39. The drive shaft 39 is connected to a differential 40 that is mounted in a rear axle housing 41 for the rear wheels 13. The gears 37 and 38 are mounted in a housing 42 that is mounted on the housing 18.

A vertically disposed tubular post 43 is journalled, at its lower end, in a base 44 that is mounted on the chassis 11. A turn table 45 is mounted on the post 43 above the base 44 and four reinforcing gussets 46 are connected to the post 43 and the turn table 45. The periphery of the turn table 45 is provided with a groove to engage a steel cable 47 and the cable 47 is trained over pulleys 48 and 49, respectively. The pulley 48 is mounted on a shaft 50 that is journalled in a base 51 that is mounted on the chassis 11. The pulley 49 is mounted on a shaft 52 that is also journalled on the chassis 11. A clamp 53 is rigidly attached to the cable 47 and the clamp 53 is connected to a stem 54 of a piston for a double acting hydraulic cylinder 55. The cylinder 55 is mounted on the chassis 11 and is provided with inlet and outlet supply lines 56 and 57, respectively. The turn table 45 is mounted on rollers, not shown, to permit easy rotation thereof by the cable 47.

A boom 58 is provided at one end with a fork 59 that is pivotally connected to the post 43 by a pivot pin 60. A pair of short levers 61 are pivotally connected by a short shaft 62 to the free end of the boom 58. A lever 61 is mounted on each side of the boom 58 and a fork 63 is connected to the levers 61. The fork 63 rotatably mounts a turn table 64 thereon by means of a short shaft 65 which extends through a platform 66 that is fixed to the turn table 64. The turntable 64 has a groove in the periphery thereof to engage a steel cable 67 which also engages the pulleys 68 and 69, respectively. A clamp 70 is connected to the cable 67 and to a stem 71 of a piston for a double acting hydraulic cylinder 72. Railways 73 are provided on the forward end and sides of the platform 66 to prevent the operator from pulling off of the platform 66. To maintain the platform 66 in a horizontal plane at all times, a leveling arm 74 is pivotally connected to the levers 61 by a pin 75. The arm 74 has a fork 76 on the opposite end that is pivotally connected by a pin 77 to the post 43.

A counterbalance 78 is connected to the post 43 by a pair of circular bands 79 to counterbalance the weight of the boom 58. A double acting hydraulic cylinder 80 has a stem 81 that is pivotally connected at 82 to the boom 58. The cylinder 80 is pivoted at 83 to the chassis 11 and the cylinder 80 is used to raise and lower the boom 38.

For steering the front wheels 12 by means of the tie rod 84, a clamp 85 is connected to the tie rod 84 and to a stem 86 of a double acting hydraulic cylinder 87. The cylinder 87 is provided with inlet and outlet supply pipes 88 and 89, respectively, for the control thereof.

For the operation of the various moving parts of the crane 10, a supply line 90 connects the compressor 17 to a pressure regulator 91.

A common supply line 92 leads from the regulator 91 and is connected at its end to a control valve 93. The valve 93 is connected to the cylinder 33 by supply lines 35 and 36, respectively, a branch line 94 connects the supply line 92 to a control valve 95 which is connected to the cylinder 87 by supply lines 88 and 89. A branch line 96 connects the supply line 92 to a control valve 97 which is connected to the cylinder 80 by supply lines 98 and 99, respectively. A branch line 100 connects the supply line 92 to a control valve 101 which is connected to the cylinder 55 by supply lines 56 and 57. A branch line 102 connects the supply line 92 to a control valve 103 which is connected to the cylinder 72 by supply lines 104 and 105, respectively.

The control valves 93, 95, 97, 101 and 103 are mounted on the railings 73 so that the crane 10 can be operated at all times from the platform 66.

The crane 10 may be driven to the desired location in an orchard with the platform 66 in the down or mounted position, as shown in FIG. 1. With the operator standing on the platform 66, the control valve 93 can be operated to drive the crane 10 through the clutch arrangement of FIG. 6. The steering of the front wheels is accomplished by means of the operation of the control valve 95.

When the crane 10 reaches the desired location, the boom 58 can be raised by operation of the control valve 97. The boom can be moved to the right or left by operation of the control valve 101 and the platform 66 can be moved from right to left by operation of the control valve 103.

The crane 10 is thus self-propelled and all moving parts thereof are controlled by hydraulic cylinders. The small engine 15 used by the crane 10 furnishes motive power as well as operating the compressor for the operation of the cylinders. All of the supply lines are connected along their length to the boom 58 with sufficient play therein to prevent breakage thereof as the boom 58 is operated.

The crane 10 has a short turning radius and may easily run down the rows between the trees of an orchard servicing one half of each tree as it passes. The boom 58 may swing from right to left a sufficient distance to service both sides and the platform 66 is also capable of moving from right to left as it services each tree. The crane 10 may be reversed and moved as desired and it is believed that from the foregoing description the structure and operation of the crane 10 will be apparent to those skilled in the art.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A crane comprising a mobile chassis, an elevated workman's platform, a boom extending between and connected to said chassis and said platform, a fork rigidly mounted to said platform having legs extending on opposite sides of one end of said boom, a shaft extending through said legs and said boom, a fork integrally formed on the other end of said boom, a vertical post positioned between the legs of the second of said forks, a pair of levers pivotally connected to the boom, a leveling arm extending between and pivotally connected to said levers and said post to maintain said platform in a horizontal plane, said platform having a circular turntable rigidly secured thereto, said turntable having a groove on the peripheral edge thereof, a steel cable positioned in the groove in said turntable, a clamp connected to said cable, a double acting hydraulic cylinder having a piston therein that is connected to said clamp so that upon actuation of the piston in said cylinder said cable will operatively rotate said turntable and the platform connected thereto.

References Cited in the file of this patent

UNITED STATES PATENTS

| | | |
|---|---|---|
| 1,926,697 | Murphy | Sept. 12, 1933 |
| 2,483,811 | Cullen | Oct. 4, 1949 |
| 2,627,560 | Eitel | Feb. 3, 1953 |
| 2,647,022 | Smid | July 28, 1953 |
| 2,674,500 | Hukari | Apr. 6, 1954 |